(12) United States Patent
Kanai

(10) Patent No.: US 7,817,912 B2
(45) Date of Patent: Oct. 19, 2010

(54) OPTICAL SYSTEM OF A FOCUS DETECTION APPARATUS

(75) Inventor: Moriyasu Kanai, Saitama (JP)

(73) Assignee: Hoya Corporation, Tokyo (JP)

( * ) Notice: Subject to any disclaimer, the term of this patent is extended or adjusted under 35 U.S.C. 154(b) by 232 days.

(21) Appl. No.: 12/116,453

(22) Filed: May 7, 2008

(65) Prior Publication Data

US 2008/0285966 A1 Nov. 20, 2008

(30) Foreign Application Priority Data

May 15, 2007 (JP) ............................. 2007-129225

(51) Int. Cl.
*G02B 7/28* (2006.01)
*G03B 7/099* (2006.01)

(52) U.S. Cl. ...................... 396/114; 396/111

(58) Field of Classification Search ................. 396/111, 396/114

See application file for complete search history.

(56) References Cited

U.S. PATENT DOCUMENTS

| 4,474,448 | A | * | 10/1984 | Momiyama | ................. | 396/114 |
| 4,650,309 | A | * | 3/1987 | Ishida et al. | ................... | 396/97 |
| 4,670,645 | A | * | 6/1987 | Ohtaka et al. | ............ | 250/201.8 |
| 4,716,431 | A | | 12/1987 | Shindo | | |
| 4,772,912 | A | | 9/1988 | Ishida et al. | | |
| 4,849,782 | A | * | 7/1989 | Koyama et al. | ............. | 396/114 |
| 5,004,902 | A | * | 4/1991 | Matsui et al. | ............. | 250/201.8 |
| 5,017,005 | A | * | 5/1991 | Shindo | ....................... | 356/125 |
| 5,678,097 | A | * | 10/1997 | Suda | ........................ | 396/113 |
| 6,188,845 | B1 | | 2/2001 | Sensui | | |
| 2001/0048813 | A1 | | 12/2001 | Sensui | | |
| 2005/0280735 | A1 | | 12/2005 | Nakahara | | |
| 2006/0055813 | A1 | | 3/2006 | Nakata et al. | | |
| 2006/0078323 | A1 | | 4/2006 | Nakahara | | |
| 2006/0104622 | A1 | | 5/2006 | Nakata | | |
| 2007/0019939 | A1 | * | 1/2007 | Takase et al. | ............... | 396/111 |
| 2007/0103754 | A1 | * | 5/2007 | Takamiya et al. | ........... | 359/204 |
| 2007/0280666 | A1 | | 12/2007 | Nakahara | | |

FOREIGN PATENT DOCUMENTS

| JP | 60-235110 | 11/1985 |
| JP | 6-109970 | 4/1994 |
| JP | 8-12321 | 2/1996 |
| JP | 10-68863 | 3/1998 |

OTHER PUBLICATIONS

English language Abstract of JP 6-109970, Apr. 22, 1994.
English language Abstract of JP 10-68863, Mar. 10, 1998.

* cited by examiner

*Primary Examiner*—Rodney E Fuller
(74) *Attorney, Agent, or Firm*—Greenblum & Bernstein P.L.C.

(57) ABSTRACT

An optical system of a focus detection apparatus includes a condenser lens positioned behind an expected focal plane of a photographing lens; an auxiliary lens group positioned behind the condenser lens to be coaxial therewith; and a pair of separator lenses positioned behind the auxiliary lens group in close vicinity thereof and integrally molded from resin. An object image formed on the expected focal plane is divided into two images by the pair of separator lenses to be reformed on a pair of areas on a sensor, respectively, and the auxiliary lens group includes a negative lens element made of resin, and a positive lens element made of glass.

7 Claims, 4 Drawing Sheets

OPTICAL SYSTEM OF A FOCUS DETECTION APPARATUS

BACKGROUND OF THE INVENTION

1. Field of the Invention

The present invention relates to an optical system of a focus detection apparatus, and more specifically to a phase-difference-detection focus detection apparatus which is incorporated in, e.g., a single lens reflex camera or the like.

2. Description of the Prior Art

A focus detection apparatus for use in an SLR (single lens reflex) camera or the like in which a pair of light bundles passed through different portions of an exit pupil of a photographing lens are formed as a pair of images on a corresponding pair of areas on a line sensor (area sensor/photoelectric transducer) via a pair of separator lenses (image reforming lenses) of a focus detection optical system, respectively, to detect the focus state of the photographing lens based on output signals of the line sensor is known in the art (see Japanese examined patent application publication H08-12321). In this type of focus detection apparatus, it is determined that an in-focus state has been obtained when the distance (phase difference) between the pair of images (first and second images) on the line sensor is a predetermined distance with respect to a target object located at a certain distance, or it is determined that an out-of-focus state (front focus state) in which focus is achieved on an object in front of a target object and an out-of-focus state (rear focus state) in which focus is achieved on an object behind a target object have been obtained when the this distance (phase difference) is shorter and longer than the aforementioned predetermined distance, respectively, and thereupon, an amount of focus deviation from the in-focus position is output as an amount of defocus. The space between the pair of images varies according to a variation of the space between the pair of separator lenses of the focus detection optical system. It is common for a pair or pairs of separator lenses of the focus detection apparatus to be integrally molded out of resin for the purpose of miniaturizing the focus detection apparatus, and reducing the production cost thereof.

In the case where resin-made lenses are used as the separator lenses, a temperature variation changes the space between the separator lenses, thus changing the space between the first image and the second image, that are respectively formed on the pair of areas on the line sensor, and also the amount of defocus. Therefore, a configuration which detects the temperature of the focus detection apparatus and corrects the amount of defocus according to the detected temperature of the focus detection apparatus has been proposed in, e.g., Japanese unexamined patent publication S60-235110.

On the other hand, an example which mechanically offsets the variation of the space between the separator lenses, caused by a temperature variation, by a temperature variation of another member has been proposed. For instance, a configuration in which the amount of defocus is maintained constant regardless of temperature variations by varying the distance between the line sensor and the pair of resin-made separator lenses, by warping (caused by a temperature variation) a curved portion of a support member which supports the pair of resin-made separator lenses, has been proposed in Japanese unexamined patent publication H10-68863.

However, in conventional focus detection apparatuses, it is difficult to secure an installation space for a temperature sensor and wiring therefor in the vicinity of a pair of separator lenses (image-reforming lenses) because the separator lenses are usually integrally molded from resin to miniaturize the focus detection system, as mentioned above. There are cases where sensor data on the temperature sensor is used for purposes other than the purpose of detecting focus. In such cases, the temperature sensor and the pair of separator lenses are installed separately from each other with a certain distance thereapart. Even if the sensor data on the temperature sensor is attempted to be used to correct the amount of defocus, detected focus detection data cannot be corrected properly with the sensor data on the temperature sensor because the temperature of the sensing portion of the temperature sensor and the temperature of the separator lenses sometimes do not coincide with each other.

In a method of changing the position of the separator lenses by utilizing variations in shape of a resin-made separator lens support member which are caused by temperature variations, the shape of the separator lens support member varies excessively to thereby make it difficult to maintain optical linearity if the sensitivity to the amount of defocus by variations of the distance between the separator lenses and the line sensor is low. If this sensitivity is high, an extremely high installation accuracy is required, so that the influence of external vibrations or shake easily causes positional shift, etc., of optical members such as line sensors and the separator lenses.

SUMMARY OF THE INVENTION

The present invention has been devised in view of the above described drawbacks of prior art and provides an optical system for a phase-difference-detection focus detection apparatus which can detect an in-focus state with a high degree of precision even if the ambient temperature varies.

According to an aspect of the present invention, an optical system of a focus detection apparatus is provided, including a condenser lens positioned behind an expected focal plane of a photographing lens; an auxiliary lens group positioned behind the condenser lens to be coaxial therewith; and a pair of separator lenses positioned behind the auxiliary lens group in close vicinity thereof and integrally molded from resin. An object image formed on the expected focal plane is divided into two images by the pair of separator lenses to be reformed on a pair of areas on a sensor, respectively, and the auxiliary lens group includes a negative lens element made of resin, and a positive lens element made of glass.

It is desirable for the optical system to include a separator mask which is positioned between the auxiliary lens group and the pair of separator lenses and includes a pair of apertures facing the pair of separator lenses, respectively, wherein the resin-made lens element, the glass-made lens element, the pair of separator lenses and the separator mask satisfy the following condition (1):

$$0.2 < t_s \cdot f_n / (F_{IN} \cdot m_0 \cdot q_n \cdot P) < 1.1 \qquad (1),$$

wherein $f_n$ designates a focal length of the resin-made auxiliary lens group, P designates a distance between optical axes of the pair of separator lenses, $q_n$ designates a rate of focal length change of the resin-made auxiliary lens element due to a temperature change thereof which corresponds to the sum of a variation in shape and a variation in refractive index according to a linear expansion coefficient, $t_s$ designates a linear expansion coefficient of the pair of separator lenses due to a temperature change thereof, $F_{IN}$ designates an f-number of the optical system of the focus detection apparatus that is determined by said pair of apertures of said separator lens mask, and $m_0$ designates a magnification of the optical system of the focus detection apparatus.

It is desirable for the optical system to include a separator mask which is positioned between the auxiliary lens group and the pair of separator lenses and includes a pair of apertures facing the pair of separator lenses, respectively, wherein the resin-made lens element, the glass-made lens element, the pair of separator lenses and the separator mask satisfy the following condition (1):

$$0.2 < t_s \cdot f_n / (F_{IN} \cdot m_0 \cdot q_n \cdot P) < 1.1 \quad (1),$$

wherein $f_n$ designates a focal length of the resin-made auxiliary lens group, P designates a distance between optical axes of the pair of separator lenses, $q_n$ designates a rate of focal length change of the resin-made auxiliary lens element due to a temperature change thereof by 30 degrees centigrade, which corresponds to the sum of a variation in shape and a variation in refractive index according to a linear expansion coefficient, $t_s$ designates a linear expansion coefficient of the pair of separator lenses due to a temperature change thereof by 30 degrees centigrade, $F_{IN}$ designates an f-number of the optical system of the focus detection apparatus that is determined by principal rays respectively passed through the pair of apertures of said separator lens mask, and $m_0$ designates a magnification of the optical system of the focus detection apparatus.

It is desirable for a range of temperature change of the $q_n$ and $t_s$ to be 20° C.±30° C.

It is desirable for the resin-made auxiliary lens element and the glass-made auxiliary lens element to satisfy the following condition (2):

$$-0.1 < 1/(m_2 \cdot m_3) < 4.0 \quad (2),$$

wherein $m_2$ designates a magnification of one of the resin-made auxiliary lens element and the glass-made auxiliary lens element which is closer to the photographing lens, and $m_3$ designates a magnification of the other of the resin-made auxiliary lens element and the glass-made auxiliary lens element which is closer to the image sensor.

According to the present invention, an optical system of a focus detection apparatus in which a focal point of the optical system does not deviate regardless of temperature variations is achieved.

The present disclosure relates to subject matter contained in Japanese Patent Applications No. 2007-129225 (filed on May 15, 2007) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
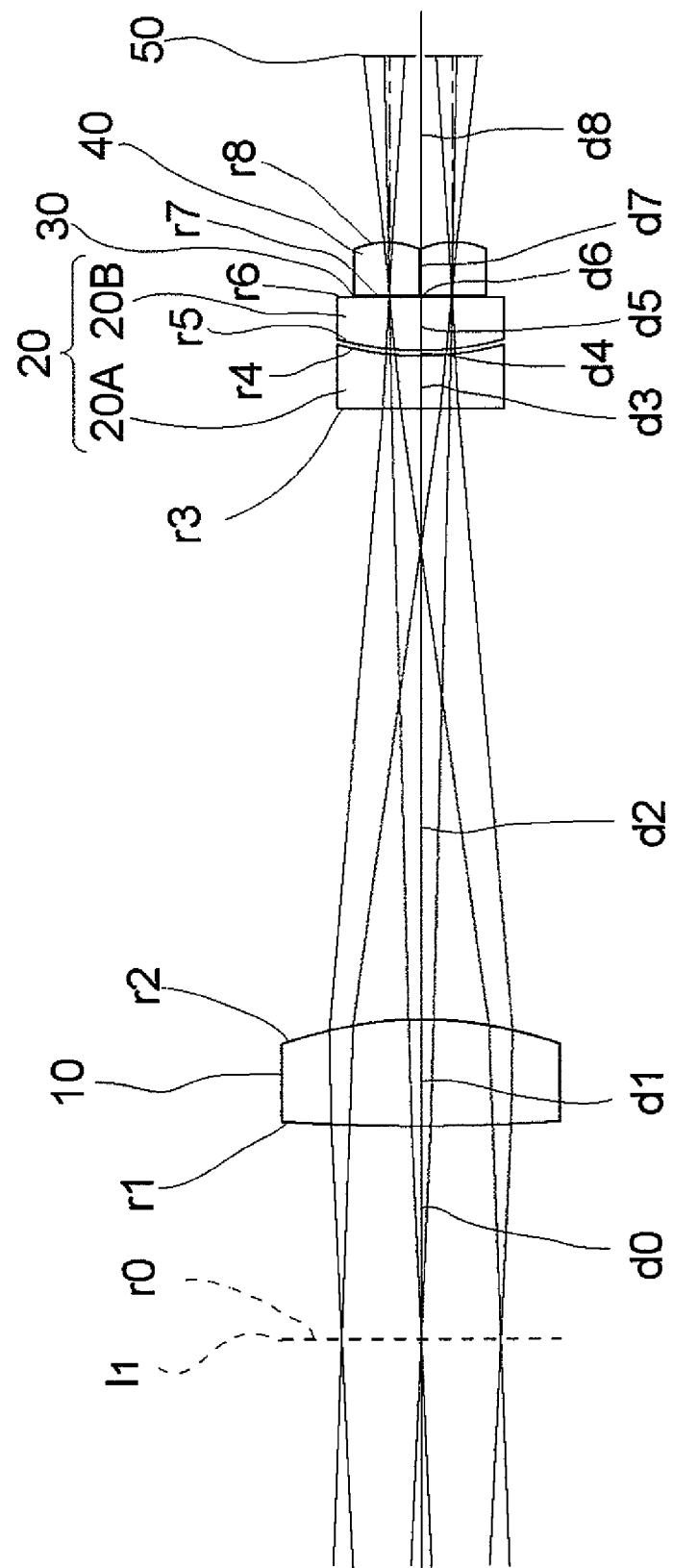
FIG. 1 is a lens system configuration of a first embodiment of an optical system of a focus detection apparatus according to the present invention.

The optical system of a focus detection apparatus according to the present invention is provided with a condenser lens 10, an auxiliary lens group 20, a separator lens mask (diaphragm) 30, a pair of separator lenses 40 and an image sensor (line sensor) 50 which are arranged in that order from the photographing lens side. The auxiliary lens group 20 includes a first auxiliary lens element 20A and a second auxiliary lens element 20B which are arranged in that order from the photographing lens side. One of the first auxiliary lens element 20A and the second auxiliary lens element 20B is made of resin and the other thereof is made of glass. The pair of separator lenses 40 are integrally molded from plastic (resin).

The optical system according to the present invention satisfies the following equations:

$$df_1 = -(1 - 1/m_1)^2 \cdot f_1 \cdot q_1,$$

$$df_2 = -(1 - 1/m_2)^2 \cdot f_2 \cdot q_2 \cdot (1/m_1)^2,$$

$$df_3 = -(1 - 1/m_3)^3 \cdot f_3 \cdot q_3 \cdot (1/m_2)^2 \cdot (1/m_1)^2,$$

$$df_s = -(1 - m_4) \cdot P \cdot t_s \cdot F_{IN}/m_0,$$

wherein $df_1$ designates the variation in focal point of the condenser lens 10 due to a temperature variation; $df_2$ designates the variation in focal point of the first auxiliary lens element 20A due to a temperature variation; $df_3$ designates the variation in focal point of the second auxiliary lens element 20B due to a temperature variation; $df_s$ designates the variation in focal point of the pair of separator lenses 40 due to a variation of the distance between the optical axes of the pair of separator lenses 40 caused by a temperature variation; $m_1$, $m_2$, $m_3$ and $m_4$ designate the magnifications of the condenser lens 10, the first auxiliary lens element 20A, the second auxiliary lens element 20B and the pair of separator lenses 40, respectively; $f_1$, $f_2$, and $f_3$ designate the focal lengths of the condenser lens 10, the first auxiliary lens element 20A and the second auxiliary lens element 20B, respectively; and $q_1$, $q_2$, and $q_3$ designate the rates of focal length changes of the condenser lens 10, the first auxiliary lens element 20A and the second auxiliary lens element 20B due to a temperature increase (temperature rise of 30 degrees centigrade) thereof (wherein each rate corresponds to the sum of a variation in shape and a variation in refractive index according to a linear expansion coefficient).

If the sum of the focal point variations $df_1$, $df_2$, $df_3$ and $df_s$ is sufficiently small within a common range of ambient temperature (approximately 20±30° C.), the focal point varies little regardless of temperature variations. Namely, the following condition (A) regarding temperature and focal point variations only needs to be satisfied within the aforementioned common range of ambient temperature (approximately 20±30° C.):

$$|df_1 + df_2 + df_3 + df_s| < \alpha \quad (A).$$

"α" in this condition can be a depth of focus that is determined by the pixel size (image size) of an image pickup device, and the tolerance of the depth of focus is usually set to the order of 0.02 to 0.05 mm though it changes according to the f-number of the photographing lens in the case of, e.g., a single lens reflex camera. Accordingly, the sum of the focal point variations $df_1$, $df_2$, $df_3$ and $df_s$ and other variations of each optical element needs to be smaller than 0.05 mm, desirably smaller than 0.02 mm. Although it is conceivable that the focal point variations $df_1$, $df_2$, $df_3$ and $df_s$ be the main factors causing focal point variations due to temperature variations, and an expansion/contraction of the support member for the optical elements and a variation in focal length of the pair of separator lenses itself can also be factors causing focal point variations due to temperature variations, it is often the case that the influence of such factors is relatively small, and therefore, the description thereof is herein omitted. However, in the case where the influence of such factors is not negligible, it is possible to make corrections accordingly. Making such corrections does not depart from the sprit and scope of the invention.

The optical system of the focus detection apparatus according to the present invention can satisfy the above-noted condition (A) by satisfying the following condition (1) that defines the power of the resin-made auxiliary lens element (20A or 20B) so as to correct a variation of the distance between the optical axes of the pair of separator lenses 40 which is caused by a temperature variation:

$$0.2 < t_s \cdot f_n / (F_{IN} \cdot m_0 \cdot q_n \cdot P) < 1.1 \qquad (1),$$

wherein $f_n$ designates the focal length of the resin-made auxiliary lens element (20A or 20B); P designates the distance between the optical axes of the pair of separator lenses 40; $q_n$ designates the rate of focal length change of the resin-made auxiliary lens element 20A or 20B due to a temperature increase thereof (which corresponds to the sum of a variation in shape and a variation in refractive index according to a linear expansion coefficient); $t_s$ designates the linear expansion coefficient of the pair of separator lenses 40 due to a temperature increase thereof; $F_{IN}$ designates the f-number of the optical system of the focus detection apparatus that is determined by the principal rays respectively passed through the pair of apertures of the separator lens mask 30; and $m_0$ designates the magnification of the entire optical system of the focus detection apparatus.

These values are necessary as parameters in the condition (1) since variations in power of the resin-made auxiliary lens element 20A or 20B due to temperature variations and also variations of the distance between the optical axes of the pair of separator lenses 40 due to temperature variations are influenced directly by the linear expansion coefficient and variations in refractive index of the resin material used to mold the resin-made auxiliary lens element 20A or 20B. In addition, even if the distance between the optical axes of the pair of separator lenses 40 is fixed, the amount of defocus defers if the f-number (determined by the pair of apertures of the separator lens mask 30 that determine the accuracy of detection of a focal point) when light is incident on the focus detection apparatus and the magnification of the entire optical system of the focus detection apparatus differ.

However, the lower and upper limits of condition (1) are determined in consideration of the fact that there is a certain degree of latitude in the installation position of the resin-made auxiliary lens element 20A or 20B in the optical system of the focus detection apparatus and the influence of the condenser lens 10 via the variation in focal point of the condenser lens 10 due to a temperature variation is relatively small. Accordingly, if the value "$t_s \cdot f_n / (F_{IN} \cdot m_0 \cdot q_n \cdot P)$" in the condition (1) exceeds the upper limit (=1.1) to the extent that the power of the resin-made auxiliary lens element 20A or 20B becomes insufficient, it is determined that a front-focus state is obtained even if an in-focus state is achieved. Conversely, if the value "$t_s \cdot f_n / (F_{IN} \cdot m_0 \cdot q_n \cdot P)$" in the condition (1) becomes smaller than the lower limit (=0.2), the power of the resin-made auxiliary lens element 20A or 20B becomes excessively large and it is determined that a rear-focus state is obtained even if an in-focus state is achieved. Consequently, an out-of-focus state results even when it is determined that an in-focus state is obtained.

The following condition specifies the size and the brightness of the optical system of the focus detection apparatus:

$$-0.1 < 1/(m_2 \cdot m_3) < 4.0 \qquad (2),$$

wherein $m_2$ represents the magnification of the first auxiliary lens element 20A that is positioned on the photographing lens side, and $m_3$ represents the magnification of the second auxiliary lens element 20B that is positioned on the image sensor 50 side.

In condition (2), "$1/(m_2 \cdot m_3)$" is the reciprocal of the resultant power of the auxiliary lens group 20 (20A and 20B). If this value is smaller than 1, the resultant power of the auxiliary lens group 20 (20A and 20B) takes a positive value. If the reciprocal of the resultant power of the auxiliary lens group 20 (20A and 20B) "$1/(m_2 \cdot m_3)$" is 0 (zero), the space between the auxiliary lens group 20 (20A and 20B) and the pair of separator lenses 40 falls into an afocal state, so that a light bundle which is passed through the center of an expected focal plane (on an optical axis) of the photographing lens becomes parallel to the optical axis and enters the pair of separator lenses 40. Supposing that 'P' designates the distance between the optical axes of the pair of separator lenses 40 and that 'L' designates the space (base length) between the first image and the second image formed on a pair of areas on the image sensor (line sensor) 50 via the pair of separator lenses 40, respectively, when focus is achieved on the image sensor (line sensor) 50, the following equation is satisfied:

$$P \approx L$$

If the reciprocal of the resultant power of the auxiliary lens group 20 (20A and 20B) "$1/(m_2 \cdot m_3)$" is smaller than 0 (zero), the following condition is satisfied:

$$P > L,$$

which causes an increase in the distance between the optical axes of the pair of separator lenses 40, which in turn causes an increase in size of the entire optical system. Accordingly, the lower limit of condition (2) enables the miniaturization of the entire optical system.

On the other hand, if the reciprocal of the resultant power of the auxiliary lens group 20 (20A and 20B) "$1/(m_2 \cdot m_3)$" exceeds 1, the resultant power of the auxiliary lens group 20 (20A and 20B) takes a negative value. Although this is advantageous to miniaturization of the optical system, a light bundle which is passed through the center of an expected focal plane (on an optical axis) is diverged, so that the angle of incidence of the light bundle on the pair of separator lenses 40 increases. Consequently, the following condition is satisfied:

$$P << L,$$

so that the distance P between the optical axes of the pair of separator lenses 40 is narrowed, which narrows the distance between the pair of separator lenses 40 that are adjacent to each other, thus reducing the effective diameter of each separator lens 40 to thereby make it impossible to secure a sufficient diameter of the light bundle for forming an image on the image sensor 50. Therefore, the amount of light reaching the image sensor 50 decreases, so that sufficient brightness cannot be secured. Accordingly, the upper limit of the condition (2) is a condition for securing brightness.

Tables 1 through 4 below show numerical data of first through fourth embodiments of the optical systems of the focus detection apparatuses according to the present invention, respectively. Table 5 shows specifications of each of the first through fourth embodiments of the optical systems of the focus detection apparatuses, the amounts of variation in focal point after the ambient temperature increases to 30 degrees centigrade from a reference temperature of 20 degrees centigrade, and the values of the conditions (1) and (2) in each of the first through fourth embodiments of the optical systems of the focus detection apparatuses. It can be understood from Table 5 that the focal point varies little in each embodiment even if the temperature rises.

The following is a description of the numerical data of first through fourth embodiments of the optical systems of the focus detection apparatuses according to the present invention. In the lens configuration drawings and tables below, r designates the radius of curvature of each lens surface, d designates the lens thickness or the distance between the lens elements, $N_d$ designates the refractive index at the d-line, and ν designates the Abbe number.

In addition, the shape of the rotationally-symmetrical aspheric surface can be generally expressed as follows.

$$x = cy^2/[1+[1-(1+K)c^2y^2]^{1/2}]A_4y^4+A_6y^6+A_8y^8+A_{10}y^{10}+A_{12}y^{12}$$

wherein c represents the radius of curvature (1/r), y represents a height from the axis, K represents a conic constant, and $A_4$, $A_6$, $A_8$, $A_{10}$ and $A_{12}$, etc., designate aspherical coefficients.

Embodiment 1

FIG. 1 is a lens system configuration of a first embodiment of the optical system of the focus detection apparatus according to the present invention. Table 1 below shows numerical data on the first embodiment of the optical system of the focus detection apparatus. In this optical system, the condenser lens 10, the auxiliary lens group 20 (the first auxiliary lens element 20A and the second auxiliary lens element 20B), the separator lens mask (diaphragm) 30, the pair of separator lenses 40 and the image sensor (line sensor) 50 are arranged in that order from the photographing lens side. The condenser lens 10 is made of plastic, the first auxiliary lens element 20A is made of plastic, the second auxiliary lens element 20B is made of glass, and the pair of separator lenses 40 is made of plastic. Note that "$I_1$" shown in FIGS. 1 through 4 designates the primary image-forming surface (expected focal plane) on which an object image is to be formed by the photographing lens (not shown).

TABLE 1

| SURFACE No. | r | d | Nd | ν |
|---|---|---|---|---|
| 0 | PIFS | 4.00 | | |
| 1 | 40.000 | 2.00 | 1.49176 | 57.4 |
| 2* | −7.155 | 11.50 | | |
| 3 | ∞ | 1.00 | 1.49176 | 57.4 |
| 4 | 6.000 | 0.10 | | |
| 5 | 6.025 | 1.00 | 1.48749 | 70.2 |
| 6 | ∞ | 0.04 | | |
| 7 | ∞ | 1.00 | 1.49176 | 57.4 |
| 8 | −1.500 | 3.52 | | |

PIFS: Primary image-forming surface
The asterisk "*" designates a rotationally-symmetrical aspheric surface.
Data on the aspheric surface (aspherical aberration coefficients not shown are 0.00): SURFACE No. 2: K = −2.50

Embodiment 2

Figure 2:
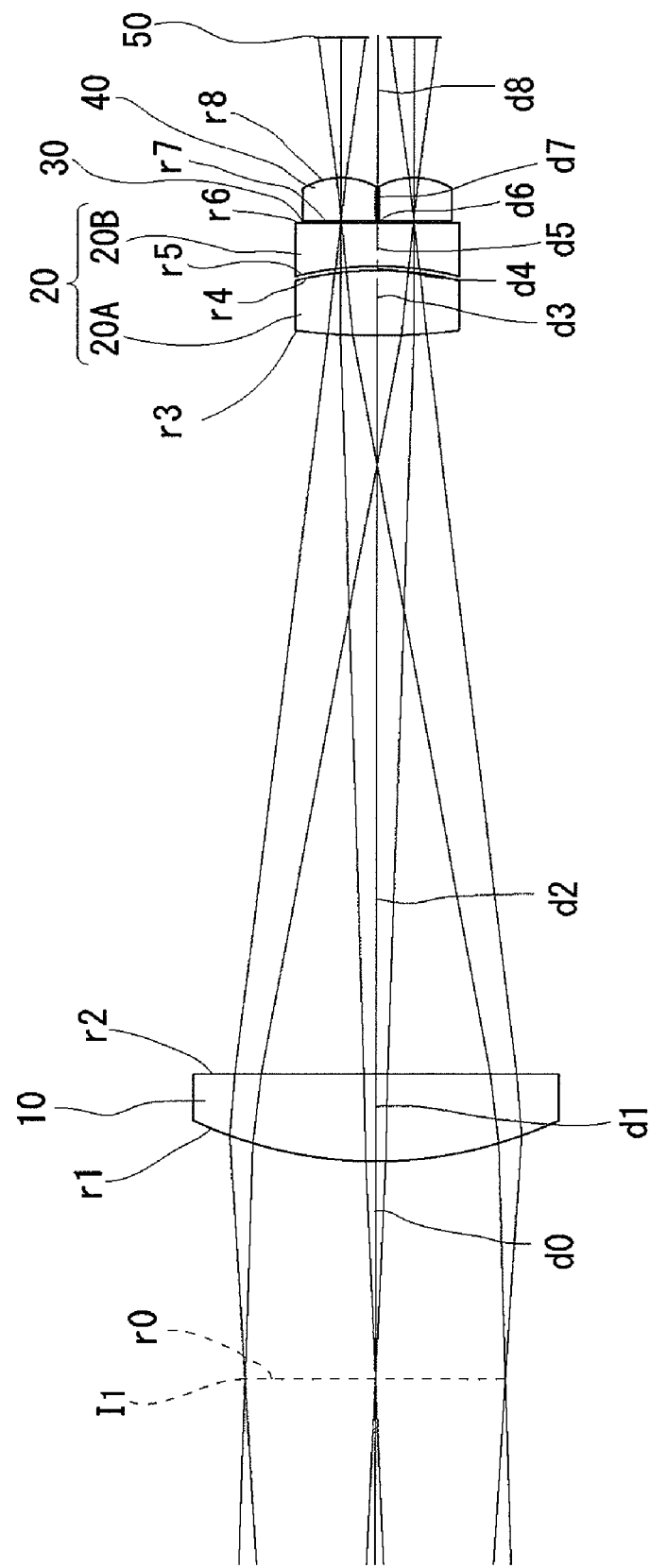
FIG. 2 is a lens system configuration of a second embodiment of the optical system of the focus detection apparatus according to the present invention.

FIG. 2 is a lens system configuration of a second embodiment of the optical system of the focus detection apparatus according to the present invention. Table 2 below shows numerical data on the second embodiment of the optical system of the focus detection apparatus. In this optical system, the condenser lens 10, the auxiliary lens group 20 (the first auxiliary lens element 20A and the second auxiliary lens element 20B), the separator lens mask (diaphragm) 30, the pair of separator lenses 40 and the image sensor (line sensor) 50 are arranged in that order from the photographing lens side. The condenser lens 10 is made of plastic, the first auxiliary lens element 20A is made of glass, the second auxiliary lens element 20B is made of plastic, and the pair of separator lenses 40 is made of plastic.

TABLE 2

| SURFACE No. | r | d | Nd | ν |
|---|---|---|---|---|
| 0 | PIFS | 5.00 | | |
| 1* | 9.700 | 2.00 | 1.52538 | 56.3 |
| 2 | ∞ | 17.00 | | |
| 3 | 15.000 | 1.50 | 1.58267 | 46.4 |
| 4 | −7.700 | 0.10 | | |
| 5 | −7.770 | 1.00 | 1.58547 | 29.9 |
| 6 | ∞ | 0.04 | | |
| 7 | ∞ | 1.00 | 1.52538 | 56.3 |
| 8 | −1.700 | 3.24 | | |

PIFS: Primary image-forming surface
The asterisk "*" designates a rotationally-symmetrical aspheric surface.
Data on the aspheric surface (aspherical aberration coefficients not shown are 0.00): SURFACE No. 1: K = −0.50

Embodiment 3

Figure 3:
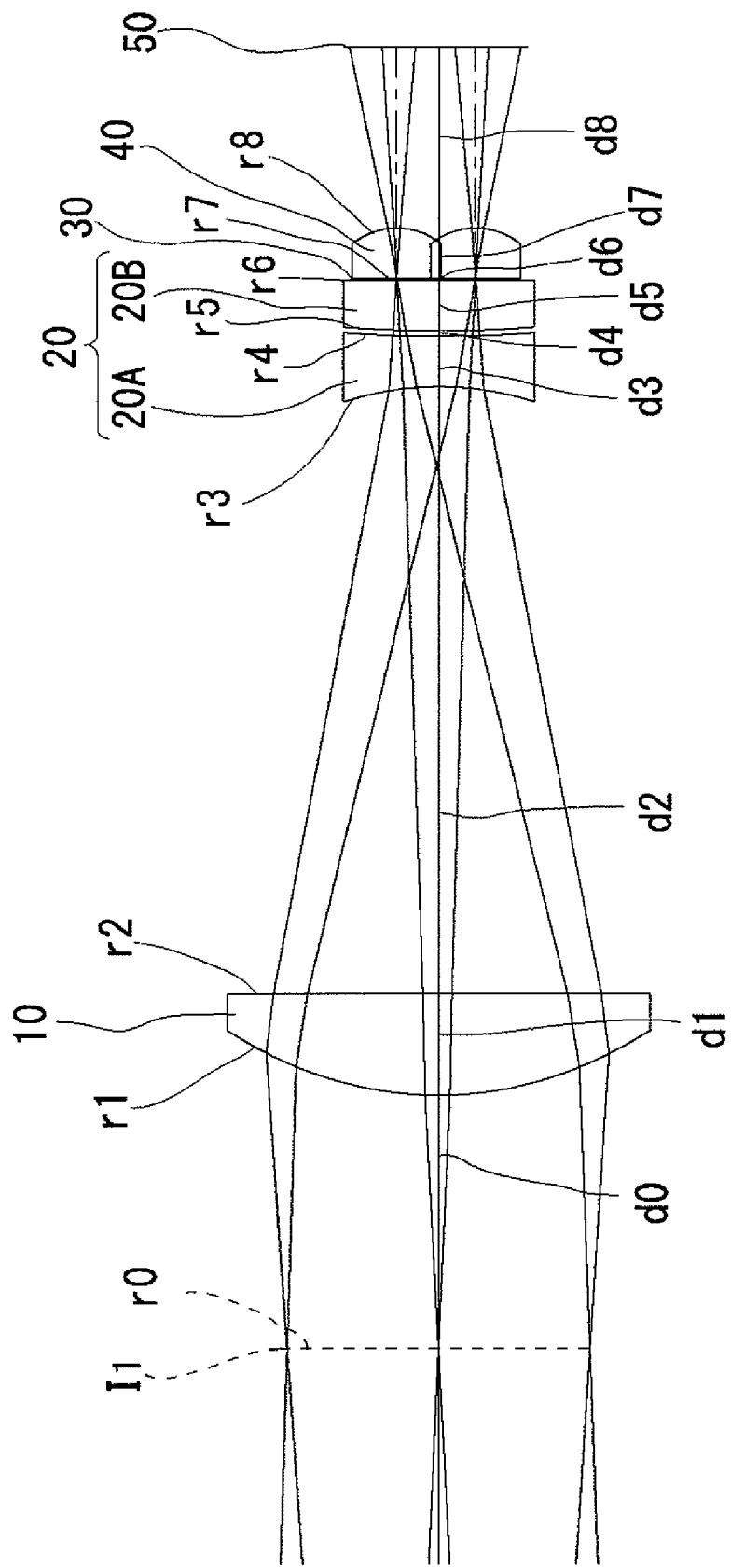
FIG. 3 is a lens system configuration of a third embodiment of the optical system of the focus detection apparatus according to the present invention.

FIG. 3 is a lens system configuration of a third embodiment of the optical system of the focus detection apparatus according to the present invention. Table 3 below shows numerical data on the third embodiment of the optical system of the focus detection apparatus. In this optical system, the condenser lens 10, the auxiliary lens group 20 (the first auxiliary lens element 20A and the second auxiliary lens element 20B), the separator lens mask (diaphragm) 30, the pair of separator lenses 40 and the image sensor (line sensor) 50 are arranged in that order from the photographing lens side. The condenser lens 10 is made of plastic, the first auxiliary lens element 20A is made of plastic, the second auxiliary lens element 20B is made of glass, and the pair of separator lenses 40 is made of plastic.

TABLE 3

| SURFACE No. | r | d | Nd | ν |
|---|---|---|---|---|
| 0 | PIFS | 5.00 | | |
| 1* | 7.200 | 2.00 | 1.52538 | 56.3 |
| 2 | ∞ | 12.00 | | |
| 3 | −6.000 | 1.00 | 1.49176 | 57.4 |
| 4 | 25.000 | 0.10 | | |
| 5 | 25.107 | 1.00 | 1.64769 | 33.8 |
| 6 | ∞ | 0.04 | | |
| 7 | ∞ | 1.00 | 1.52538 | 56.3 |
| 8 | −1.400 | 3.60 | | |

PIFS: Primary image-forming surface
The asterisk "*" designates a rotationally-symmetrical aspheric surface.
Data on the aspheric surface (aspherical aberration coefficients not shown are 0.00): SURFACE No. 1: K = −0.50

Embodiment 4

Figure 4:
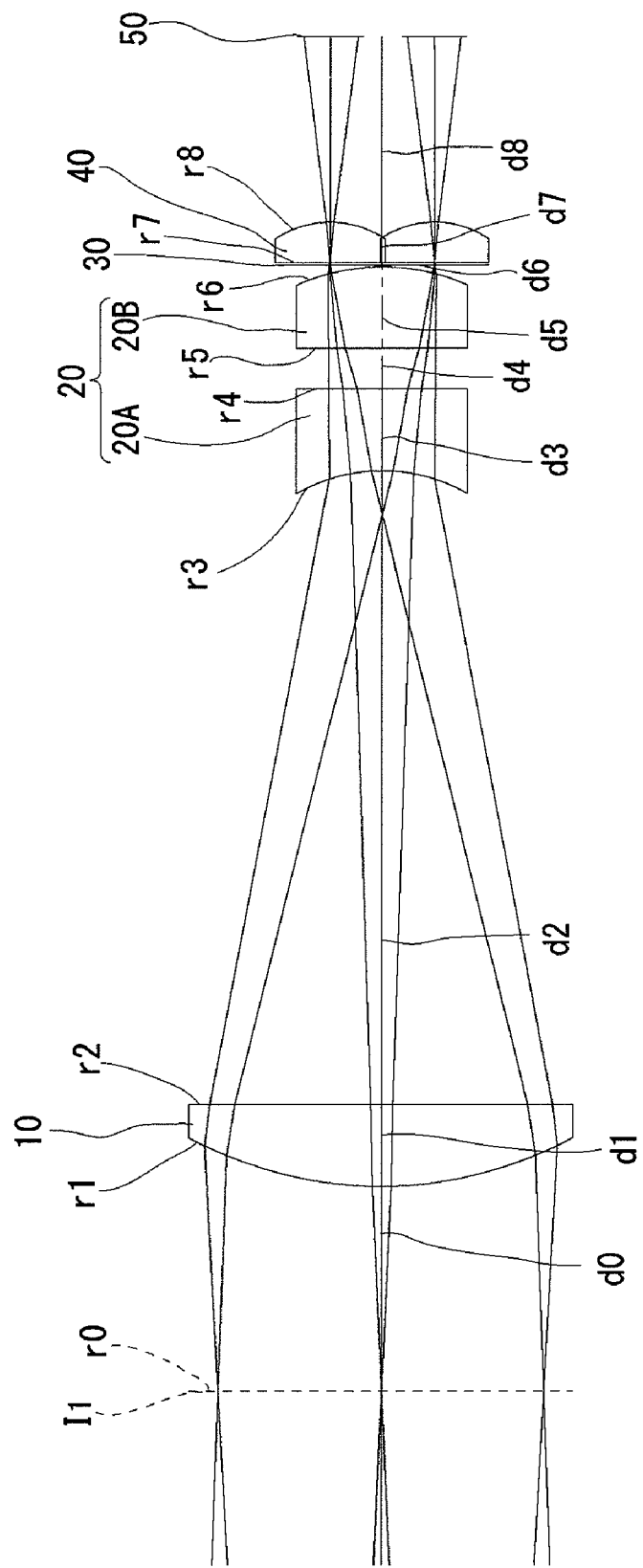
FIG. 4 is a lens system configuration of a fourth embodiment of the optical system of the focus detection apparatus according to the present invention.

FIG. 4 is a lens system configuration of a fourth embodiment of the optical system of the focus detection apparatus according to the present invention. Table 4 below shows numerical data on the fourth embodiment of the optical system of the focus detection apparatus. In this optical system, the condenser lens 10, the auxiliary lens group 20 (the first auxiliary lens element 20A and the second auxiliary lens element 20B), the separator lens mask (diaphragm) 30, the pair of separator lenses 40 and the image sensor (line sensor) 50 are arranged in that order from the photographing lens side. The condenser lens 10 is made of plastic, the first auxiliary lens element 20A is made of plastic, the second auxiliary lens element 20B is made of glass, and the pair of separator lenses 40 is made of plastic.

TABLE 4

| SURFACE No. | r | d | Nd | ν |
|---|---|---|---|---|
| 0 | PIFS | 5.00 | | |
| 1* | 9.700 | 2.00 | 1.52538 | 56.3 |
| 2 | ∞ | 15.50 | | |
| 3 | −4.200 | 2.00 | 1.58547 | 29.9 |
| 4 | ∞ | 1.00 | | |
| 5 | ∞ | 2.00 | 1.57099 | 50.8 |
| 6 | −5.162 | 0.10 | | |
| 7 | ∞ | 1.00 | 1.52538 | 56.3 |
| 8 | −2.400 | 4.57 | | |

PIFS: Primary image-forming surface
The asterisk "*" designates a rotationally-symmetrical aspheric surface.
Data on the aspheric surface (aspherical aberration coefficients not shown are 0.00): SURFACE No. 1: $K = -0.50$ Table 5 below shows specifications of each of the first through fourth embodiments of the optical systems of the focus detection apparatuses, the amounts of variation in focal point after the ambient temperature increases to 30 degrees centigrade from a reference temperature of 20 degrees centigrade, and the values of the conditions (1) and (2) in each of the first through fourth embodiments of the optical systems of the focus detection apparatuses.

TABLE 5

| | | EMBOD. 1 | EMBOD. 2 | EMBOD. 3 | EMBOD. 4 |
|---|---|---|---|---|---|
| CONDENSER | $m_1$ | 1.700 | 1.371 | 1.574 | 1.371 |
| LENS 10 | $f_1$ | 12.517 | 18.463 | 13.704 | 18.463 |
| | $q_1$ | 0.010 | 0.009 | 0.009 | 0.009 |
| | $df_1$ | −0.021 | −0.012 | −0.016 | −0.012 |
| FIRST AUXILIARY | $m_2$ | 0.366 | −0.531 | 0.314 | 0.233 |
| LENS ELEMENT 20A | $f_2$ | −12.201 | 8.950 | −9.736 | −7.174 |
| | $q_2$ | 0.010 | 0 (GLASS) | 0.010 | 0.008 |
| | $df_2$ | 0.127 | 0 | 0.188 | 0.331 |
| SECOND | $m_3$ | 2.732 | ∞ | 1.229 | ∞ |
| AUXILIARY LENS | $f_3$ | 12.539 | −13.272 | 39.236 | 9.040 |
| ELEMENT 20 | $q_3$ | 0 (GLASS) | 0.008 | 0 (GLASS) | 0 (GLASS) |
| | $df_3$ | 0 | 0.200 | 0 | 0 |
| SEPARATOR | $m_s$ | −0.155 | 0 | −0.350 | 0 |
| LENS 40 | $t_s$ | 0.0020 | 0.0018 | 0.0018 | 0.0018 |
| | P | 1.18 | 1.68 | 1.44 | 2.56 |
| | $df_s$ | −0.114 | −0.189 | −0.182 | −0.315 |
| $F_{IN}$ | | 11 | 11 | 11 | 11 |
| $m_0$ | | −0.263 | −0.176 | −0.212 | −0.161 |
| CONDITION (A): $df_1 + df_2 + df_3 + df_s$ | | −0.009 | −0.011 | −0.010 | 0.004 |
| CONDITION (1) | | 0.715 | 0.918 | 0.521 | 0.356 |
| CONDITION (2) | | 1.000 | 0 | 2.591 | 0 |

As can be seen from Table 5 above, the first through fourth embodiments of the optical systems of the focus detection apparatuses all satisfy the above-noted conditions (1) and (2). Additionally, from the numerical values of the sum of the variations in focal point of the lenses 10, 20A, 20B and 40 due to a temperature variation, it can be understood that the variation in focal point of each lens is extremely small in spite of temperature variations.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An optical system of a focus detection apparatus, comprising:

a condenser lens positioned behind an expected focal plane of a photographing lens;

an auxiliary lens group positioned behind said condenser lens to be coaxial therewith;

a pair of separator lenses positioned behind said auxiliary lens group in close vicinity thereof and integrally molded from resin, wherein an object image formed on said expected focal plane is divided into two images by said pair of separator lenses to be reformed on a pair of areas on a sensor, respectively, and wherein said auxiliary lens group includes a negative lens element made of resin, and a positive lens element made of glass, and a separator mask which is positioned between said auxiliary lens group and said pair of separator lenses and includes a pair of apertures facing said pair of separator lenses, respectively, wherein said resin-made auxiliary lens element, said glass-made auxiliary lens element, said pair of separator lenses and said separator mask satisfy the following condition (1):

$$0.2 < t_s \cdot f_n / (F_{IN} \cdot m_0 \cdot q_n \cdot P) < 1.1 \tag{1},$$

wherein $f_n$ designates a focal length of said resin-made auxiliary lens group;

P designates a distance between optical axes of said pair of separator lenses;

$q_n$ designates a rate of focal length change of said resin-made auxiliary lens element due to a temperature change thereof which corresponds to the sum of a variation in shape and a variation in refractive index according to a linear expansion coefficient;

$t_s$ designates a linear expansion coefficient of said pair of separator lenses due to a temperature change thereof;

$F_{IN}$ designates an f-number of said optical system of said focus detection apparatus that is determined by said pair of apertures of said separator lens mask; and $m_0$ designates a magnification of said optical system of said focus detection apparatus.

2. The optical system according to claim 1, further comprising a separator mask which is positioned between said auxiliary lens group and said pair of separator lenses and includes a pair of apertures facing said pair of separator lenses, respectively, wherein said resin-made auxiliary lens element, said glass-made auxiliary lens element, said pair of separator lenses and said separator mask satisfy the following condition (1):

$$0.2<t_s \cdot f_n/(F_{IN} \cdot m_0 \cdot q_n \cdot P)<1.1 \qquad (1),$$

wherein $f_n$ designates a focal length of said resin-made auxiliary lens group;

P designates a distance between optical axes of said pair of separator lenses;

$q_n$ designates a rate of focal length change of said resin-made auxiliary lens element due to a temperature change thereof by 30 degrees centigrade, which corresponds to the sum of a variation in shape and a variation in refractive index according to a linear expansion coefficient;

$t_s$ designates a linear expansion coefficient of said pair of separator lenses due to a temperature change thereof by 30 degrees centigrade;

$F_{IN}$ designates an f-number of said optical system of said focus detection apparatus that is determined by principal rays respectively passed through said pair of apertures of said separator lens mask; and $m_0$ designates a magnification of said optical system of said focus detection apparatus.

3. The optical system according to claim 1, wherein a range of temperature change of said $q_n$ and $t_s$ is 20° C.±30° C.

4. The optical system according to claim 1, wherein said resin-made auxiliary lens element and said glass-made auxiliary lens element satisfy the following condition (2):

$$-0.1<1/(m_2 \cdot m_3)<4.0 \qquad (2),$$

wherein $m_2$ designates a magnification of one of said resin-made auxiliary lens element and said glass-made auxiliary lens element which is closer to said photographing lens, and $m_3$ designates a magnification of the other of said resin-made auxiliary lens element and said glass-made auxiliary lens element which is closer to said image sensor.

5. An optical system of a focus detection apparatus, comprising:

a condenser lens positioned behind an expected focal plane of a photographing lens;

an auxiliary lens group positioned behind said condenser lens to be coaxial therewith; and a pair of separator lenses positioned behind said auxiliary lens group in close vicinity thereof and integrally molded from resin, wherein an object image formed on said expected focal plane is divided into two images by said pair of separator lenses to be reformed on a pair of areas on a sensor, respectively, wherein said auxiliary lens group includes a negative lens element made of resin, and a positive lens element made of glass, wherein said resin-made auxiliary lens element and said glass-made auxiliary lens element satisfy the following condition (2):

$$-0.1<1/(m_2 \cdot m_3)<4.0 \qquad (2),$$

wherein $m_2$ designates a magnification of one of said resin-made auxiliary lens element and said glass-made auxiliary lens element which is closer to said photographing lens, and $m_3$ designates a magnification of the other of said resin-made auxiliary lens element and said glass-made auxiliary lens element which is closer to said image sensor.

6. The optical system according to claim 5, further comprising a separator mask which is positioned between said auxiliary lens group and said pair of separator lenses and includes a pair of apertures facing said pair of separator lenses, respectively, wherein said resin-made auxiliary lens element, said glass-made auxiliary lens element, said pair of separator lenses and said separator mask satisfy the following condition (1):

$$0.2<t_s \cdot f_n/(F_{IN} \cdot m_0 \cdot q_n \cdot P)<1.1 \qquad (1),$$

wherein $f_n$ designates a focal length of said resin-made auxiliary lens group;

P designates a distance between optical axes of said pair of separator lenses;

$q_n$ designates a rate of focal length change of said resin-made auxiliary lens element due to a temperature change thereof by 30 degrees centigrade, which corresponds to the sum of a variation in shape and a variation in refractive index according to a linear expansion coefficient;

$t_s$ designates a linear expansion coefficient of said pair of separator lenses due to a temperature change thereof by 30 degrees centigrade;

$F_{IN}$ designates an f-number of said optical system of said focus detection apparatus that is determined by principal rays respectively passed through said pair of apertures of said separator tens mask; and $m_0$ designates a magnification of said optical system of said focus detection apparatus.

7. The optical system according to claim 5, further comprising a separator mask which is positioned between said auxiliary lens group and said pair of separator lenses and includes a pair of apertures facing said pair of separator lenses, respectively, wherein said resin-made auxiliary lens element, said glass-made auxiliary lens element, said pair of separator lenses and said separator mask satisfy the following condition (1):

$$0.2<t_s \cdot f_n/(F_{IN} \cdot m_0 \cdot q_n \cdot P)<1.1 \qquad (1),$$

wherein $f_n$ designates a focal length of said resin-made auxiliary lens group;

P designates a distance between optical axes of said pair of separator lenses;

$q_n$ designates a rate of focal length change of said resin-made auxiliary lens element due to a temperature change thereof which corresponds to the sum of a variation in shape and a variation in refractive index according to a linear expansion coefficient;

$t_s$ designates a linear expansion coefficient of said pair of separator lenses due to a temperature change thereof;

$F_{IN}$ designates an f-number of said optical system of said focus detection apparatus that is determined by said pair of apertures of said separator lens mask; and $m_0$ designates a magnification of said optical system of said focus detection apparatus, wherein a range of temperature change of said $q_n$ and $t_s$ is 20° C.±30° C.

* * * * *